Figure 1:
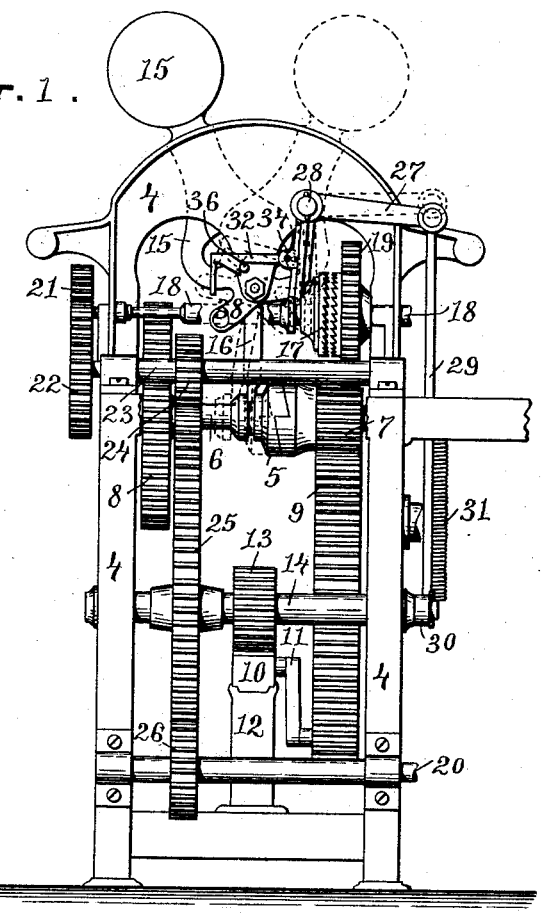

(No Model.)

J. HACKALEY.
SPINNING MULE.

No. 375,932. Patented Jan. 3, 1888.

WITNESSES:
Chas. H. Luther Jr.
Willis Fowler

INVENTOR:
John Hackaley
Joseph A. Miller & Co
Atty's

UNITED STATES PATENT OFFICE.

JOHN HACKALEY, OF FALL RIVER, MASSACHUSETTS.

SPINNING-MULE.

SPECIFICATION forming part of Letters Patent No. 375,932, dated January 3, 1888.

Application filed June 8, 1887. Serial No. 240,596. (No model.)

*To all whom it may concern:*

Be it known that I, JOHN HACKALEY, of Fall River, in the county of Bristol and State of Massachusetts, have invented certain new and useful Improvements in Spinning-Mules, of which the following is a full, clear, and exact description, reference being had to the accompanying drawings, forming part of this specification.

This invention relates to a spinning-mule of the character known as the "Mason" mule, a full description of which may be found in United States Letters Patent No. 4,779, dated October 3, 1846. The more modern form of this mule is different in many details from the construction described and shown in said patent, yet the general features of the machine are similar, and therefore the application of my invention to the modernized spinning-mule will be readily understood by reference to the aforesaid patent, which fully describes the operations and functions of all the parts of the mule-head which I have herewith illustrated. During the driving out of the carriage and the rotation of the draw-rollers, which pay out the yarn in the first series of motions of the mule, the roller-clutch is closed and the driving-in clutch is opened, and this condition of affairs is maintained until the third series of motions is begun, whereupon the aforesaid condition of the said clutches is reversed, the roller-clutch being opened and the driving-in clutch closed. These two clutches therefore connect and disconnect parts of the apparatus which necessarily work in opposite directions, since they are each closed in turn as the carriage is drawn out and in, respectively, so that if both the clutches should happen to be closed at the same time the result would be that the clutches would be working against each other.

In the Mason mule as heretofore constructed the driving-in clutch remains closed until shortly after the roller-clutch is closed, and thus these clutches are allowed to work against each other for an appreciable time. The consequence of this is that the mechanisms connected with each of the said clutches are unnecessarily strained and jarred by the opposed actions of these connected parts, the parts driven by one clutch being operated by the momentum thereof, while the parts driven by the other clutch are operated by the positive motion of its connected driving-pulley, since obviously the driving-belt cannot be operating the respective driving-out and driving-in pulleys at the same time. Besides the resulting damage to the machinery of the mule, this defective condition will interfere seriously with the easy working of an attachment of the mule known as a "nosing-motion," which is designed to prevent the kinking of the yarn as it is built into the cop in order to form a firm cop-nose. A description and illustration of this nosing-motion may be found in Patent No. 205,380, granted to me June 25, 1878, and the effect of the aforesaid defective condition upon the patented attachment will be at once understood by referring to the said patent.

The object of my invention is to prevent the connected mechanisms of the roller-clutch and the driving-in clutch from being placed in opposed working condition, or from working against each other; and to this purpose my invention consists, essentially, in improved means for preventing the roller-clutch from closing or clutching until after the driving-in clutch is opened or unclutched, thereby avoiding the straining and jarring of the parts of the apparatus connected with and actuated by the respective clutches.

In order that my invention may be fully understood, I have illustrated in the accompanying drawings, and will proceed to describe, the best form thereof so far devised by me, with the knowledge that such form may be variously modified without, however, making a substantial departure from the spirit of my invention, which, briefly stated, consists in means for preventing the closing of the roller-clutch until after the driving-in clutch is opened.

Figure 2:
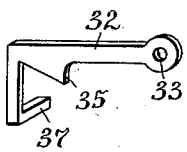

In the accompanying drawings, Figure 1 is a rear view of a Mason mule-head, showing several of the parts with which the roller-clutch and the driving-in clutch are respectively connected, and also parts which operate the clutches, together with parts which are actuated directly and indirectly by the respective clutches, some of the apparatus remote from the clutches being omitted. Fig. 2 is an enlarged perspective view of my retaining-latch, used to hold the roller-clutch open for a certain time.

In the said drawings like numbers of reference designate like parts throughout.

Referring to the drawings, the number 4 designates the frame which contains the machinery of the mule-head. The driving-in clutch 5 consists in a permanent part and a sliding part, which latter is feathered on the shaft 6, and this shaft is provided with a pinion-wheel, 7, and is rotated by the intermediate driving-in gear, 8, which receives its motion indirectly from the driving-in or second fast pulley by means of gearing. (Not shown.) The pinion 7 and the attached part of the driving-in clutch 5 run loose on the shaft 6, so that when the said clutch is closed, as shown in the full lines, the pinion 7 will be given a positive motion and will rotate the large driving-in gear 9, the partial revolution of which serves to run in—that is, toward one looking at the drawings—the bottom sliding rack, 10, connected therewith by the connecting-rod 11 and traveling on the way 12. The rack 10 moves in mesh with the pinion 13, which is mounted on the shaft 14 and communicates motion to the carriage for driving it in, as described in the aforesaid Mason patent. The driving-in clutch 5 remains closed until the carriage is drawn in to the inward limit of its traverse, whereupon the oscillating shipper-ball 15 is thrown from the full-line to the broken-line position, thereby shipping the driving-belt from the driving-in to the driving-out pulley, none of which said parts are shown except the oscillating ball 15. To the foot of the shipper-ball 15 is attached the clutch-arm 16, which engages the sliding part of the driving-in clutch 5, and the oscillations of the ball move the clutch-arm, so as to open and close the engaged clutch 5 in an obvious manner. When the ball is moved into the broken-line position, the clutch-arm is also moved into its broken-line position, thereby opening the driving-in clutch.

The roller-clutch 17 is mounted upon the draw-roller shaft 18, (shown partly in full and partly in broken lines,) and the clutch is composed of a sliding part feathered on the shaft and a permanent part which is secured to the roller-gear 19, which, together with its part of the clutch, is loose upon the shaft 18. The roller-gear is driven from the driving-out pulley through a set of gear-wheels, (not shown,) and when the roller-clutch is closed this gear will rotate the shaft 18, which will revolve the line-shaft 20 by means of the wheels 21 22, and an intermediate gear (not shown) the shaft 23 and the train of wheels 24, 25, and 26, the wheel 25 being mounted on the shaft 14. By the line-shaft 20 the carriage is then driven out.

The roller-clutch 17 is opened and closed by means of the rocking roller-clutch elbow 27, which is pivoted at 28 to the frame 4 and engages with its inner end the sliding part of the roller-clutch. To the outer end of the elbow 27 is pivoted the rod 29, which is pivoted at its lower end to the roller-clutch arm 30, (shown in end view,) and the action of which reciprocates the rod 29 and rocks the elbow 27, thereby actuating the roller-clutch. The roller-clutch arm 30 is periodically thrown into action, as described in the hereinbefore referred-to Mason patent, so that when the carriage starts out the elbow 27 is operated and closes the roller clutch, which remains closed until the reverse movement of the arm 30 causes it to be opened as the carriage approaches the end of its outward traverse. The spring 31 is attached by its respective ends to the frame 4 and to the pivoted roller-clutch arm 30, and normally tends to draw the arm upwardly and close the roller-clutch.

From the foregoing description it will be seen that the roller-clutch 17 and the driving-in clutch 5 are opposed to each other in their actions upon certain apparatus of the mule-head, and therefore when these two clutches are simultaneously closed parts of the apparatus will be acted on in opposite directions at the same time, which is an evident disadvantage. In the Mason mule as heretofore constructed the roller-clutch is closed before the opposing driving-in clutch is opened, and hence the mule is defective in this respect.

The above-described parts are all old in the spinning-mule, and I therefore make no claim to the same.

My invention consists in adding such means to this old mechanism as will prevent the roller-clutch from closing until after the driving-in clutch is opened. The most simple and efficient means I have for accomplishing this end is by the introduction of the retaining-latch 32, which consists of an L-shaped member formed with an eye, 33, at one end, by means of which it is hinged to the roller-clutch elbow 27 at 34. The latch is provided with a projection, 35, designed to engage with the stud 36, fastened to the frame 4, and at one end of the latch is constructed the trip-finger 37, which projects in toward the shipper-ball 15 and into the path of the extension 38 of the said ball, so as to be tripped thereby in order to release the projection from the stud, as shown in broken lines. After the latch is released from the stud 36 and the ball moves over into the broken-line position, the latch will drop down upon the stud, which will then rest in near the angle of the L-shaped latch, for in the meantime the roller-clutch arm, rod, and elbow have drawn the latch over to the right-hand limit and closed the clutch. As soon as the shipper-ball has moved past the center toward its dotted-line position, the foot of the ball has effected the opening of the driving-in clutch, and at this moment the foot 38 of the ball trips the latch into the dotted-line position, thereby allowing the roller-clutch to close after the driving-in clutch is opened. When the elbow 27 is subsequently moved from the broken-line into the full-line position, the latch 32 will obviously be latched over the stud again, and the above-described operations will then be repeated.

By virtue of the use of the retaining-latch 32 I am enabled to regulate precisely the time when the roller-clutch may be allowed to close, and this regulation will depend upon the relative position of the tripping-finger 37 of the latch to the foot of the shipper-ball which trips the same, and this relation may be carried so that the finger may be tripped at any time during the oscillation of the shipper-ball.

Having thus described my invention, I claim as new and desire to secure by Letters Patent—

1. The combination, as hereinbefore set forth, with the roller-clutch, the driving-in clutch, and the connected mechanism of the respective clutches, the oscillating shipper-ball, and the clutch-arm for operating the said driving-in clutch, and the roller-clutch elbow and rod for operating the said roller-clutch, of a retaining device acting to retain and retard the said clutch-elbow and engaged and released by the said shipper-ball, whereby the roller-clutch may be prevented from closing until the driving-in clutch is opened, substantially as and for the purpose herein described.

2. The combination, as hereinbefore set forth, with the roller-clutch and the clutch-elbow for operating the same, and the oscillating shipper-ball, of a retaining-latch pivoted to the said clutch-elbow, and a fixed stud engaged by the said latch, the shipper-ball engaging the said latch and acting to disengage the latch from the stud, whereby the roller-clutch elbow is released and the clutch is permitted to close, substantially as herein described.

3. The combination, as hereinbefore set forth, with the roller-clutch and the driving-in clutch, and the means, substantially as described, for operating said clutches, and the oscillating shipper-ball 15, of the retaining-latch 32, provided with the trip-finger 37, and pivoted to the said operating means of the roller-clutch, and the stud 36, engaged by said latch 32, substantially as and for the purpose herein described.

4. In a spinning-mule, the combination, as hereinbefore set forth, with the driving-in clutch and the roller-clutch, the oscillating shipper-ball for operating the driving-in clutch, and the clutch-elbow for operating the roller-clutch, of a retaining device acting to retard the action of the said clutch-elbow, such device being engaged and released to free the clutch elbow by the shipper-ball, whereby the roller-clutch may be prevented from closing until the driving-in clutch is opened, substantially as and for the purpose herein described.

JOHN HACKALEY.

Witnesses:
JOSEPH A. MILLER, Jr.,
M. F. BLIGH.